(12) United States Patent
Maan et al.

(10) Patent No.: US 11,017,238 B2
(45) Date of Patent: May 25, 2021

(54) CAPTURING TRANSACTIONAL CONTEXT

(71) Applicant: Shopify Inc., Ottawa (CA)

(72) Inventors: Daanish Bilal Maan, Brampton (CA); Peter Nitsch, Etobicoke (CA); Zhi Hui Fang, Scarborough (CA); Ricardo Vazquez, Oakville (CA); Djoume Salvetti, Toronto (CA)

(73) Assignee: Shopify Inc., Ottawa (CA)

( * ) Notice: Subject to any disclaimer, the term of this patent is extended or adjusted under 35 U.S.C. 154(b) by 68 days.

(21) Appl. No.: 16/220,022

(22) Filed: Dec. 14, 2018

(65) Prior Publication Data
US 2019/0392220 A1 Dec. 26, 2019

Related U.S. Application Data

(60) Provisional application No. 62/689,565, filed on Jun. 25, 2018.

(51) Int. Cl.
*G06K 9/00* (2006.01)
*G06Q 20/20* (2012.01)
*G07G 1/12* (2006.01)
*G07G 1/00* (2006.01)

(52) U.S. Cl.
CPC ..... *G06K 9/00744* (2013.01); *G06K 9/00228* (2013.01); *G06K 9/00778* (2013.01); *G06Q 20/20* (2013.01); *G07G 1/0009* (2013.01); *G07G 1/0018* (2013.01); *G07G 1/12* (2013.01); *G06K 2009/00738* (2013.01)

(58) Field of Classification Search
CPC ........... G06K 9/00744; G06K 9/00228; G06K 9/00778; G06K 2009/00738; G07G 1/0009; G07G 1/0018; G07G 1/12; G06Q 20/20; G06Q 20/202; G06Q 20/3224; G06Q 20/206
See application file for complete search history.

(56) References Cited

U.S. PATENT DOCUMENTS

| | | | |
|---|---|---|---|
| 2004/0155960 A1* | 8/2004 | Wren | H04N 7/18 348/150 |
| 2007/0182818 A1* | 8/2007 | Buehler | G08B 13/19641 348/143 |
| 2008/0018738 A1* | 1/2008 | Lipton | G08B 13/1968 348/143 |
| 2012/0030107 A1* | 2/2012 | Gibson | G06Q 20/42 705/43 |
| 2016/0021169 A1* | 1/2016 | Chan | H04L 67/04 709/217 |
| 2016/0026782 A1* | 1/2016 | Smowton | H04L 9/3231 726/19 |
| 2016/0092740 A1* | 3/2016 | Teller | G06K 9/6202 348/150 |
| 2017/0193503 A1* | 7/2017 | Oppenheim | G06Q 20/401 |

* cited by examiner

Primary Examiner — Wesley J Tucker
(74) Attorney, Agent, or Firm — Moffat & Co

(57) ABSTRACT

Disclosed are systems and methods of capturing sensor data associated with a retail location. The systems and methods further include a point-of-sale device for processing customer transactions and generating an event trigger for capturing sensor data from one or more of the sensors at the retail location. In response to the event trigger, the systems and methods capture data from the one or more sensors at the retail location and provide access to the stored sensor data and event triggers via a user interface of the point-of-sale device for review of the stored sensor data and event trigger.

36 Claims, 8 Drawing Sheets

FIG. 2

ID
CAPTURING TRANSACTIONAL CONTEXT

CROSS-REFERENCE TO RELATED APPLICATIONS

This application claims the benefit of U.S. Provisional Application Ser. No. 62/689,565, filed Jun. 25, 2018, and entitled "CAPTURING TRANSACTIONAL CONTEXT", which is hereby incorporated by reference in its entirety.

BACKGROUND

Stationary and mobile point-of-sale terminals are gaining acceptance in the retail industry. The terminals maybe handheld terminals, such as tablets or phone devices, or may be dedicated devices fixed to particular location. Mobile terminals have become increasingly more functional. Examples of such functions include data and voice communications, capturing images and video via a camera, recording audio, playing music and other audio via a speaker system, and displaying images and video on a display.

Moreover, these devices have become more functional by connecting wired and wirelessly to peripherals and other external devices to control the peripherals and external devices to expand functionality. For example, terminals have been configured to connect to payment card readers as well as communicate with other mobile devices for mobile payments. However, in the retail industry, fraud and abuse is prevalent and technologies that work to prevent fraud and abuse or identify perpetrators of fraud and abuse remain a need. Specifically, fraud and abuse in the retail environment is prevalent and information to prevent fraud and abuse is a major concern for merchants. For example, theft of payment cards and payment card fraud results in chargebacks for merchants that amount to significant monetary losses. These crimes go largely unprosecuted due to the small losses per transaction and the difficulty in identifying offenders.

SUMMARY

In embodiments the present disclosure provides systems and methods of capturing sensor data associated with a retail location. The systems and methods may further include, with a point-of-sale device for processing customer transactions, generating an event trigger for capturing sensor data from one or more of the sensors at the retail location; in response to the event trigger, capturing data from the one or more sensors at the retail location; and providing access to the stored sensor data and event triggers via a user interface of the point-of-sale device for review of the stored sensor data and event trigger.

In other embodiments of the systems and methods, the one or more sensors comprises a plurality of sensors further comprising the step of determining a subset of the plurality of sensors from which to capture sensor data.

In other embodiments of the systems and methods, the sensor data is stored on a remote data storage server.

In other embodiments of the systems and methods, one or more of the sensors is a camera and the sensor data is at least one of image data and video data.

In other embodiments of the systems and methods, one of the sensors is a camera and the sensor data is video data from a predetermined period of time before and after the event trigger.

In other embodiments of the systems and methods, one or more of the sensors is a camera integrated within the point-of-sale device and the sensor data is at least one of image data and video data.

In other embodiments of the systems and methods, the point-of-sale device communicates directly with the sensors.

In other embodiments of the systems and methods, the point-of-sale device communicates with the sensors indirectly through an intermediate server.

In other embodiments of the systems and methods, the event trigger is at least one of: an occurrence of a transaction, a clearance or denial of a payment transaction, a voiding of a sales transaction, a turning on or off of the point-of-sale device, an opening of a cash drawer, a change in network connection, a product return or refund, a printing of a sales receipt, an entry of a new customer profile or address, a redemption of rewards or customer loyalty program points, a purchase of a specific product, a purchase of products over a price threshold, a purchase of products by a specific customer or customer matching certain criteria, an entry of a layaway transaction, an entry of a special order transaction, a purchase of an extended product warranty, scanning of a product bar code, movement of the point-of-sale device to a location or a predetermined distance from a home location, or removal from a stand, and/or the identification of a face in a camera frame.

Also provided are systems and methods for capturing sensor data associated with a retail location. The systems and methods may include a point-of-sale device for processing transactions wherein the point-of-sale device comprises a display, the point-of-sale device adapted to transmit an event trigger for capturing sensor data from one or more sensors located at the retail location, the point-of-sale device further being in data communication with a data storage medium that stores the captured sensor data from the one or more sensors and wherein the user interface provides access to the stored sensor data and event triggers to review stored sensor data and event trigger.

In other embodiments of the systems and methods, the one or more sensors are located within the retail location for capturing data about the retail location.

In other embodiments of the systems and methods, the one or more sensors comprises a plurality of sensors and wherein the point-of-sale device is adapted to determine a subset of the plurality of sensors from which to capture sensor data.

In other embodiments of the systems and methods, a remote data storage server in data communication with the point-of-sale device and the sensor and wherein the sensor data is stored on the remote data storage server.

In other embodiments of the systems and methods, one or more sensors comprises a plurality of sensors and wherein the remote data storage server is adapted to determine a subset of the plurality of sensors from which to capture sensor data.

In other embodiments of the systems and methods, one or more of the sensors is a camera and the sensor data is at least one of image data and video data.

In other embodiments of the systems and methods, one or more of the sensors is a camera and the sensor data is video data from a predetermined period of time before and after the event trigger.

In other embodiments of the systems and methods, the point-of-sale device further comprises an integrated camera and one of the sensors comprises the integrated camera and the sensor data is at least one of image data and video data.

In other embodiments of the systems and methods, the point-of-sale device communicates directly with the sensors.

In other embodiments of the systems and methods, the point-of-sale device communicates with the sensors indirectly through an intermediate server.

In other embodiments of the systems and methods, the event trigger is at least one of: an occurrence of a transaction, a clearance or denial of a payment transaction, a voiding of a sales transaction, a turning on or off of the point-of-sale device, an opening of a cash drawer, a change in network connection, a product return or refund, a printing of a sales receipt, an entry of a new customer profile or address, a redemption of rewards or customer loyalty program points, a purchase of a specific product, a purchase of products over a price threshold, a purchase of products by a specific customer or customer matching certain criteria, an entry of a layaway transaction, an entry of a special order transaction, a purchase of an extended product warranty, scanning of a product bar code, movement of the point-of-sale device to a location or a predetermined distance from a home location, or removal from a stand, and/or the identification of a face in a camera frame.

Also provided are systems and methods for capturing camera data associated with a retail location. The systems and methods may include a point-of-sale device for processing transactions wherein the point-of-sale device is adapted to transmit an event trigger for capturing at least one of image and video data from one or more cameras located at the retail location, the point-of-sale device further being in data communication with a data storage medium that stores the captured image and video data from the one or more cameras and wherein a user interface of the point-of-sale device provides access to the stored image and video data and event triggers to review stored image and video data and event triggers.

In other embodiments of the systems and methods, the one or more cameras are located within the retail location for capturing at least one of an image or video about the retail location.

In other embodiments of the systems and methods, the one or more cameras comprises a plurality of cameras and wherein the point-of-sale device is adapted to determine a subset of the plurality of cameras from which to capture image and video data.

In other embodiments of the systems and methods, the data storage medium comprises a remote data storage server in data communication with the point-of-sale device and the one or more cameras, and wherein the image and video data is stored on the remote data storage server.

In other embodiments of the systems and methods, the one or more cameras comprises a plurality of cameras and wherein the remote data storage server is adapted to determine a subset of the plurality of cameras from which to capture image and video data.

In other embodiments of the systems and methods, the sensor data is video data from a predetermined period of time before and after the event trigger.

In other embodiments of the systems and methods, the point-of-sale device further comprises an integrated camera and the image and video data is data captured by the integrated camera.

In other embodiments of the systems and methods, the point-of-sale device communicates directly with the cameras.

In other embodiments of the systems and methods, the point-of-sale device communicates with the cameras indirectly through an intermediate server.

In other embodiments of the systems and methods, the event trigger is at least one of: an occurrence of a transaction, a clearance or denial of a payment transaction, a voiding of a sales transaction, a turning on or off of the point-of-sale device, an opening of a cash drawer, a change in network connection, a product return or refund, a printing of a sales receipt, an entry of a new customer profile or address, a redemption of rewards or customer loyalty program points, a purchase of a specific product, a purchase of products over a price threshold, a purchase of products by a specific customer or customer matching certain criteria, an entry of a layaway transaction, an entry of a special order transaction, a purchase of an extended product warranty, scanning of a product bar code, movement of the point-of-sale device to a location or a predetermined distance from a home location, or removal from a stand, and/or the identification of a face in a camera frame.

In other embodiments of the systems and methods, the system is adapted to analyze the image and video data and data related to transactions to present an indication of times of day when the retail location was busy or not busy.

In other embodiments of the systems and methods, the system is adapted to capture image data including a customer's face, identify a customer identity based upon the image data and correlate customer facial recognition data with the transaction information to identify repeat customers.

In other embodiments of the systems and methods, the system is adapted to analyze image and video data to determine employee compliance, prevent or identify theft, observe foot traffic, and determine product and display popularity.

In other embodiments of the systems and methods, the system is adapted to capture image data including a customer's face and analyze the image data to estimate customer demographic data.

In other embodiments of the systems and methods, the system is adapted to analyze image and video data to determine areas of a retail location that are experiencing high activity and low activity.

In other embodiments of the systems and methods, the system is adapted to analyze image and video data to determine the location of the point-of-sale device at the time of the transaction.

BRIEF DESCRIPTION OF THE FIGURES

FIG. 2 depicts an embodiment of a home page of an administrator;

DETAILED DESCRIPTION

The present disclosure will now be described in detail by describing various illustrative, non-limiting embodiments thereof with reference to the accompanying drawings and exhibits. The disclosure may, however, be embodied in many different forms and should not be construed as being limited to the illustrative embodiments set forth herein. Rather, the embodiments are provided so that this disclosure will be thorough and will fully convey the concept of the disclosure to those skilled in the art.

Figure 1:
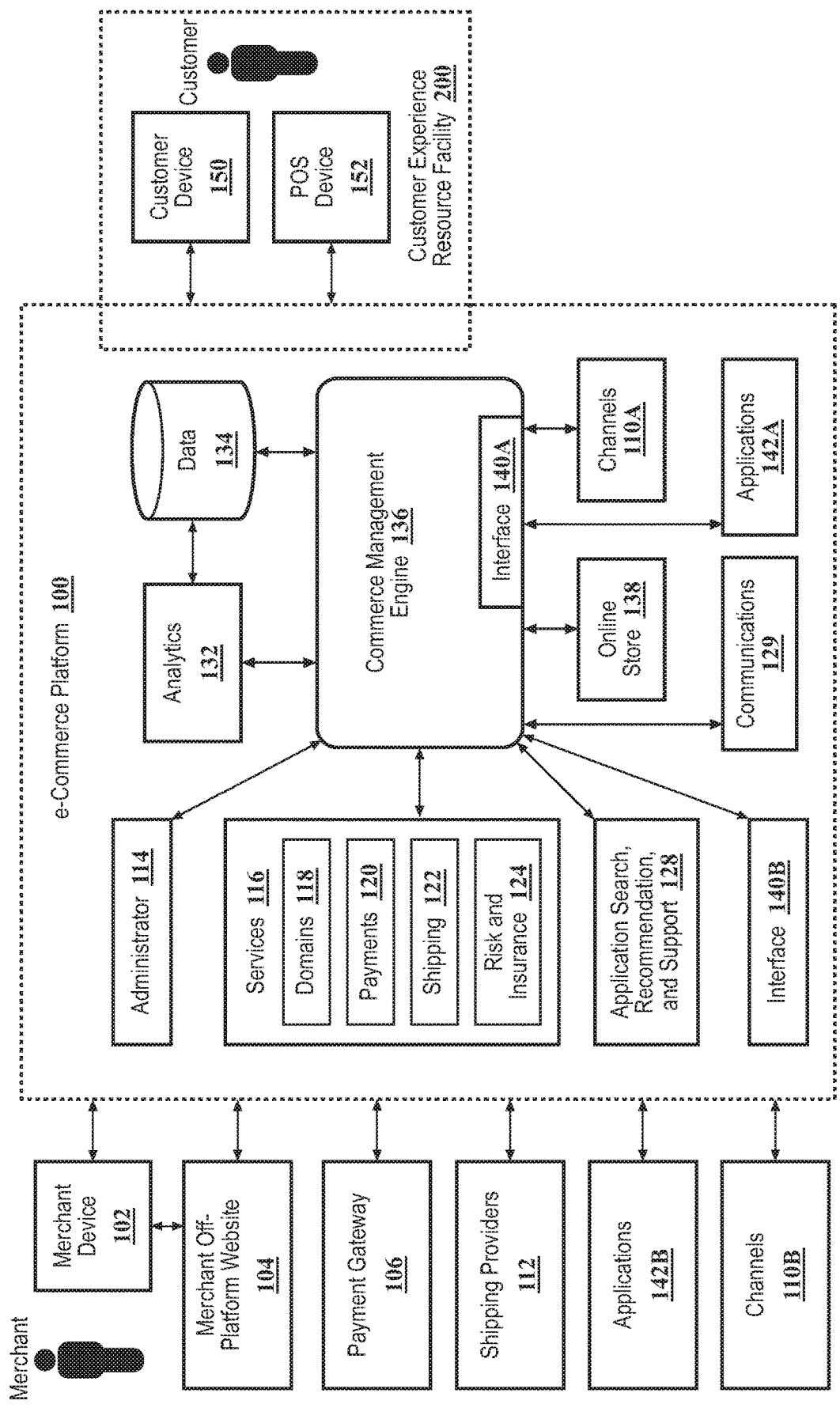
FIG. 1 depicts an embodiment of an e-commerce platform.

With reference to FIG. 1, an embodiment e-commerce platform 100 is depicted for providing merchant products and services to customers. While the disclosure throughout contemplates using the apparatus, system, and process disclosed to purchase products and services, for simplicity the description herein will refer to products. All references to products throughout this disclosure should also be understood to be references to products and/or services, including physical products, digital content, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like.

The e-commerce platform 100 may provide a centralized system for providing merchants with online resources and facilities for managing their business. The facilities described herein may be deployed in part or in whole through a machine that executes computer software, modules, program codes, and/or instructions on one or more processors which may be part of or external to the platform 100. Merchants may utilize the e-commerce platform 100 for managing commerce with customers, such as by implementing an e-commerce experience with customers through an online store 138, through channels 110A-B, through point-of-sale (POS) devices 152 in physical locations (e.g., a physical storefront or other location such as through a kiosk, terminal, reader, printer, 3D printer, and the like), by managing their business through the e-commerce platform 100, and by interacting with customers through a communications facility 129 of the e-commerce platform 100, or any combination thereof. A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform), and the like. However, even these 'other' merchant commerce facilities may be incorporated into the e-commerce platform, such as where POS devices 152 in a physical store of a merchant are linked into the e-commerce platform 100, where a merchant off-platform website 104 is tied into the e-commerce platform 100, such as through 'buy buttons' that link content from the merchant off platform website 104 to the online store 138, and the like.

The online store 138 may represent a multitenant facility comprising a plurality of virtual storefronts. In embodiments, merchants may manage one or more storefronts in the online store 138, such as through a merchant device 102 (e.g., computer, laptop computer, mobile computing device, and the like), and offer products to customers through a number of different channels 110A-B (e.g., an online store 138; a physical storefront through a POS device 152; electronic marketplace, through an electronic buy button integrated into a website or social media channel such as on a social network, social media page, social media messaging system; and the like). A merchant may sell across channels 110A-B and then manage their sales through the e-commerce platform 100, where channels 110A may be provided internal to the e-commerce platform 100 or from outside the e-commerce channel 110B. A merchant may sell in their physical retail store, at pop ups, through wholesale, over the phone, and the like, and then manage their sales through the e-commerce platform 100. A merchant may employ all or any combination of these, such as maintaining a business through a physical storefront utilizing POS devices 152, maintaining a virtual storefront through the online store 138, and utilizing a communication facility 129 to leverage customer interactions and analytics 132 to improve the probability of sales. Throughout this disclosure the terms online store 138 and storefront may be used synonymously to refer to a merchant's online e-commerce offering presence through the e-commerce platform 100, where an online store 138 may refer to the multitenant collection of storefronts supported by the e-commerce platform 100 (e.g., for a plurality of merchants) or to an individual merchant's storefront (e.g., a merchant's online store).

In embodiments, a customer may interact through a customer device 150 (e.g., computer, laptop computer, mobile computing device, and the like), a POS device 152 (e.g., retail device, a kiosk, an automated checkout system, and the like), or any other commerce interface device known in the art. The e-commerce platform 100 may enable merchants to reach customers through the online store 138, through POS devices 152 in physical locations (e.g., a merchant's storefront or elsewhere), to promote commerce with customers through dialog via electronic communication facility 129, and the like, providing a system for reaching customers and facilitating merchant services for the real or virtual pathways available for reaching and interacting with customers.

In embodiments, and as described further herein, the e-commerce platform 100 may be implemented through a processing facility including a processor and a memory, the processing facility storing a set of instructions that, when executed, cause the e-commerce platform 100 to perform the e-commerce and support functions as described herein. The processing facility may be part of a server, client, network infrastructure, mobile computing platform, cloud computing platform, stationary computing platform, or other computing platform, and provide electronic connectivity and communications between and amongst the electronic components of the e-commerce platform 100, merchant devices 102, payment gateways 106, application developers, channels 110A-B, shipping providers 112, customer devices 150, POS devices 152, and the like. The e-commerce platform 100 may be implemented as a cloud computing service, a software as s service (SaaS), infrastructure as a service (IaaS), platform as a service (PaaS), desktop as a Service (DaaS), managed software as a service (MSaaS), mobile backend as a service (MBaaS), information technology management as a service (ITMaaS), and the like, such as in a software and delivery model in which software is licensed on a subscription basis and centrally hosted (e.g., accessed by users using a client (for example, a thin client) via a web browser or other application, accessed through by POS devices, and the like). In embodiments, elements of the e-commerce platform 100 may be implemented to operate on various platforms and operating systems, such as iOS, Android, on the web, and the like (e.g., the administrator 114 being implemented in multiple instances for a given online store for iOS, Android, and for the web, each with similar functionality).

In embodiments, the online store 138 may be served to a customer device 150 through a webpage provided by a server of the e-commerce platform 100. The server may receive a request for the webpage from a browser or other application installed on the customer device 150, where the browser (or other application) connects to the server through an IP Address, the IP address obtained by translating a domain name. In return, the server sends back the requested webpage. Webpages may be written in or include Hypertext Markup Language (HTML), template language, JavaScript, and the like, or any combination thereof. For instance, HTML is a computer language that describes static information for the webpage, such as the layout, format, and content of the webpage. Website designers and developers may use the template language to build webpages that combine static content, which is the same on multiple pages, and dynamic content, which changes from one page to the next. A template language may make it possible to re-use the static elements that define the layout of a webpage, while dynamically populating the page with data from an online store. The static elements may be written in HTML, and the dynamic elements written in the template language. The template language elements in a file may act as placeholders, such that the code in the file is compiled and sent to the customer device 150 and then the template language is replaced by data from the online store 138, such as when a theme is installed. The template and themes may consider tags, objects, and filters. The client device web browser (or other application) then renders the page accordingly.

In embodiments, online stores 138 may be served by the e-commerce platform 100 to customers, where customers can browse and purchase the various products available (e.g., add them to a cart, purchase immediately through a buy-button, and the like). Online stores 138 may be served to customers in a transparent fashion without customers necessarily being aware that it is being provided through the e-commerce platform 100 (rather than directly from the merchant). Merchants may use a merchant configurable domain name, a customizable HTML theme, and the like, to customize their online store 138. Merchants may customize the look and feel of their website through a theme system, such as where merchants can select and change the look and feel of their online store 138 by changing their theme while having the same underlying product and business data shown within the online store's product hierarchy. Themes may be further customized through a theme editor, a design interface that enables users to customize their website's design with flexibility. Themes may also be customized using theme-specific settings that change aspects, such as specific colors, fonts, and pre-built layout schemes. The online store may implement a content management system for website content. Merchants may author blog posts or static pages and publish them to their online store 138, such as through blogs, articles, and the like, as well as configure navigation menus. Merchants may upload images (e.g., for products), video, content, data, and the like to the e-commerce platform 100, such as for storage by the system (e.g. as data 134). In embodiments, the e-commerce platform 100 may provide functions for resizing images, associating an image with a product, adding and associating text with an image, adding an image for a new product variant, protecting images, and the like.

As described herein, the e-commerce platform 100 may provide merchants with transactional facilities for products through a number of different channels 110A-B, including the online store 138, over the telephone, as well as through physical POS devices 152 as described herein. The e-commerce platform 100 may include business support services 116, an administrator 114, and the like associated with running an on-line business, such as providing a domain service 118 associated with their online store, payment services 120 for facilitating transactions with a customer, shipping services 122 for providing customer shipping options for purchased products, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In embodiments, the e-commerce platform 100 may provide for integrated shipping services 122 (e.g., through an e-commerce platform shipping facility or through a third-party shipping carrier), such as providing merchants with real-time updates, tracking, automatic rate calculation, bulk order preparation, label printing, and the like.

Figure 2:
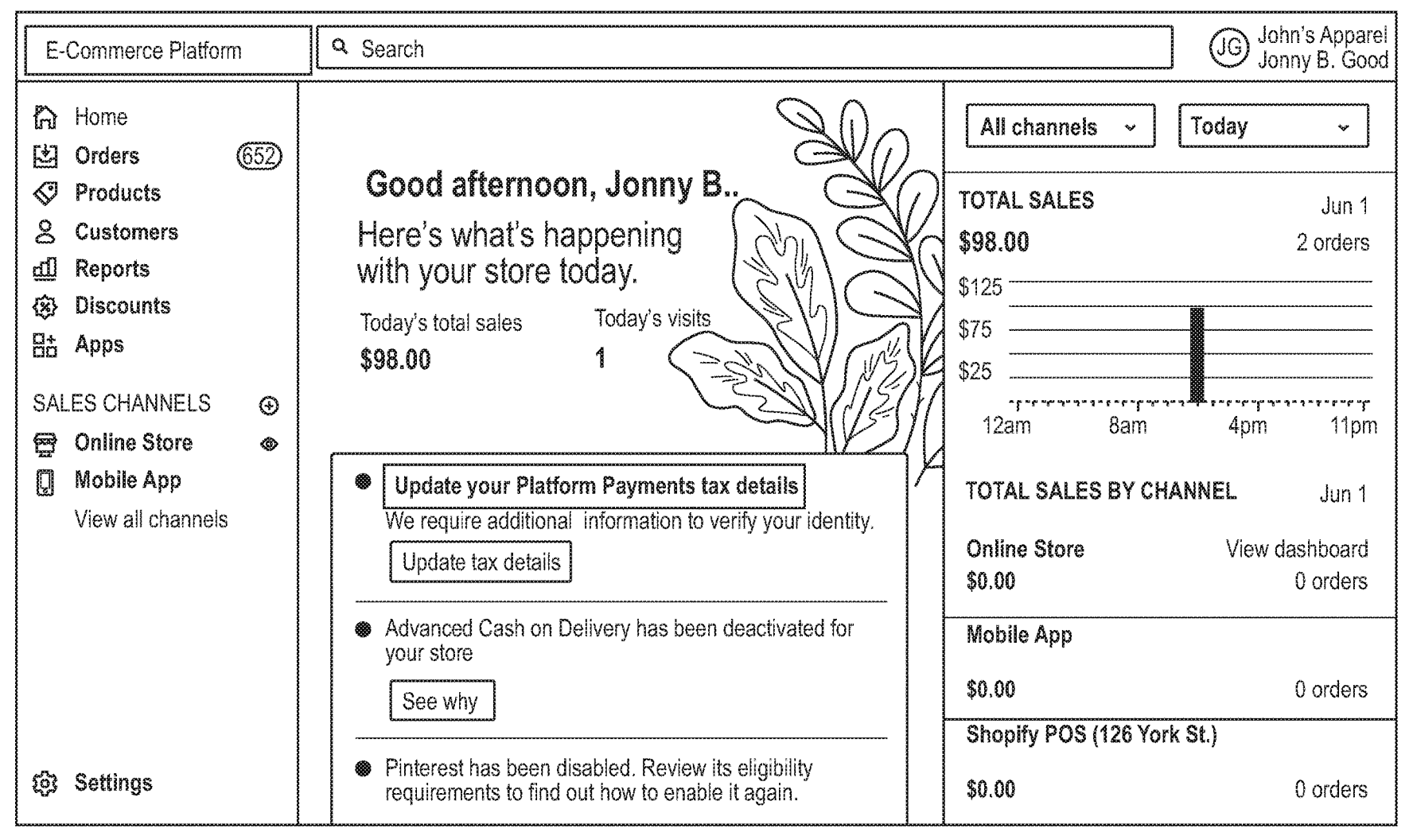

FIG. 2 depicts a non-limiting embodiment for a home page of an administrator 114, which may show information about daily tasks, a store's recent activity, and the next steps a merchant can take to build their business. In embodiments, a merchant may log in to administrator 114 via a merchant device 102 such as from a desktop computer or mobile device, and manage aspects of their online store 138, such as viewing the online store's 138 recent activity, updating the online store's 138 catalog, managing orders, recent visits activity, total orders activity, and the like. In embodiments, the merchant may be able to access the different sections of administrator 114 by using the sidebar, such as shown on FIG. 2. Sections of the administrator 114 may include various interfaces for accessing and managing core aspects of a merchant's business, including orders, products, customers, available reports and discounts. The administrator 114 may also include interfaces for managing sales channels for a store including the online store, mobile application(s) made available to customers for accessing the store (Mobile App), POS devices, and/or a buy button. The administrator 114 may also include interfaces for managing applications (Apps) installed on the merchant's account; settings applied to a merchant's online store 138 and account. A merchant may use a search bar to find products, pages, or other information. Depending on the device 102 or software application the merchant is using, they may be enabled for different functionality through the administrator 114. For instance, if a merchant logs in to the administrator 114 from a browser, they may be able to manage all aspects of their online store 138. If the merchant logs in from their mobile device (e.g. via a mobile application), they may be able to view all or a subset of the aspects of their online store 138, such as viewing the online store's 138 recent activity, updating the online store's 138 catalog, managing orders, and the like.

More detailed information about commerce and visitors to a merchant's online store 138 may be viewed through acquisition reports or metrics, such as displaying a sales summary for the merchant's overall business, specific sales and engagement data for active sales channels, and the like. Reports may include, acquisition reports, behavior reports, customer reports, finance reports, marketing reports, sales reports, custom reports, and the like. The merchant may be able to view sales data for different channels 110A-B from different periods of time (e.g., days, weeks, months, and the like), such as by using drop-down menus. An overview dashboard may be provided for a merchant that wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, and the like. Notifications may be provided to assist a merchant with navigating through a process, such as capturing a payment, marking an order as fulfilled, archiving an order that is complete, and the like.

The e-commerce platform 100 may provide for a communications facility 129 and associated merchant interface for providing electronic communications and marketing, such as utilizing an electronic messaging aggregation facility for collecting and analyzing communication interactions between merchants, customers, merchant devices 102, customer devices 150, POS devices 152, and the like, to aggregate and analyze the communications, such as for increasing the potential for providing a sale of a product, and the like. For instance, a customer may have a question related to a product, which may produce a dialog between the customer and the merchant (or automated processor-based agent representing the merchant), where the communications facility 129 analyzes the interaction and provides analysis to the merchant on how to improve the probability for a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between an e-commerce platform 100 financial institution account and a merchant's back account (e.g., when using capital), and the like. These systems may have Sarbanes-Oxley Act (SOX) compliance and a high level of diligence required in their development and operation. The financial facility 120 may also provide merchants with financial support, such as through the lending of capital (e.g., lending funds, cash advances, and the like) and provision of insurance. In addition, the e-commerce platform 100 may provide for a set of marketing and partner services and control the relationship between the e-commerce platform 100 and partners. They also may connect and onboard new merchants with the e-commerce platform 100. These services may enable merchant growth by making it easier for merchants to work across the e-commerce platform 100. Through these services, merchants may be provided help facilities via the e-commerce platform 100.

In embodiments, online store 138 may support a great number of independently administered storefronts and process a large volume of transactional data on a daily basis for a variety of products. Transactional data may include customer contact information, billing information, shipping information, information on products purchased, information on services rendered, and any other information associated with business through the e-commerce platform 100. In embodiments, the e-commerce platform 100 may store this data in a data facility 134. The transactional data may be processed to produce analytics 132, which in turn may be provided to merchants or third-party commerce entities, such as providing consumer trends, marketing and sales insights, recommendations for improving sales, evaluation of customer behaviors, marketing and sales modeling, trends in fraud, and the like, related to online commerce, and provided through dashboard interfaces, through reports, and the like. The e-commerce platform 100 may store information about business and merchant transactions, and the data facility 134 may have many ways of enhancing, contributing, refining, and extracting data, where over time the collected data may enable improvements to aspects of the e-commerce platform 100.

Referring again to FIG. 1, in embodiments the e-commerce platform 100 may be configured with a commerce management engine 136 for content management, task automation and data management to enable support and services to the plurality of online stores 138 (e.g., related to products, inventory, customers, orders, collaboration, suppliers, reports, financials, risk and fraud, and the like), but be extensible through applications 142A-B that enable greater flexibility and custom processes required for accommodating an ever-growing variety of merchant online stores, POS devices, products, and services, where applications 142A may be provided internal to the e-commerce platform 100 or applications 142B from outside the e-commerce platform 100. In embodiments, an application 142A may be provided by the same party providing the platform 100 or by a different party. In embodiments, an application 142B may be provided by the same party providing the platform 100 or by a different party. The commerce management engine 136 may be configured for flexibility and scalability through portioning (e.g., sharding) of functions and data, such as by customer identifier, order identifier, online store identifier, and the like. The commerce management engine 136 may accommodate store-specific business logic and in some embodiments, may incorporate the administrator 114 and/or the online store 138.

The commerce management engine 136 includes base or "core" functions of the e-commerce platform 100, and as such, as described herein, not all functions supporting online stores 138 may be appropriate for inclusion. For instance, functions for inclusion into the commerce management engine 136 may need to exceed a core functionality threshold through which it may be determined that the function is core to a commerce experience (e.g., common to a majority of online store activity, such as across channels, administrator interfaces, merchant locations, industries, product types, and the like), is re-usable across online stores 138 (e.g., functions that can be re-used/modified across core functions), limited to the context of a single online store 138 at a time (e.g., implementing an online store 'isolation principle', where code should not be able to interact with multiple online stores 138 at a time, ensuring that online stores 138 cannot access each other's data), provide a transactional workload, and the like. Maintaining control of what functions are implemented may enable the commerce management engine 136 to remain responsive, as many required features are either served directly by the commerce management engine 136 or enabled through an interface 140A-B, such as by its extension through an application programming interface (API) connection to applications 142A-B and channels 110A-B, where interfaces 140A may be provided to applications 142A and/or channels 110A inside the e-commerce platform 100 or through interfaces 140B provided to applications 142B and/or channels 110B outside the e-commerce platform 100. Generally, the platform 100 may include interfaces 140A-B (which may be extensions, connectors, APIs, and the like) which facilitate connections to and communications with other platforms, systems, software, data sources, code and the like. Such interfaces 140A-B may be an interface 140A of the commerce management engine 136 or an interface 140B of the platform 100 more generally. If care is not given to restricting functionality in the commerce management engine 136, responsiveness could be compromised, such as through infrastructure degradation through slow databases or non-critical backend failures, through catastrophic infrastructure failure such as with a data center going offline, through new code being deployed that takes longer to execute than expected, and the like. To prevent or mitigate these situations, the commerce management engine 136 may be configured to maintain responsiveness, such as through configuration that utilizes timeouts, queues, back-pressure to prevent degradation, and the like.

Although isolating online store data is important to maintaining data privacy between online stores 138 and merchants, there may be reasons for collecting and using cross-store data, such as for example, with an order risk assessment system or a platform payment facility, both of which require information from multiple online stores 138 to perform well. In embodiments, rather than violating the isolation principle, it may be preferred to move these components out of the commerce management engine 136 and into their own infrastructure within the e-commerce platform 100.

In embodiments, the e-commerce platform 100 may provide for a platform payment facility 120, which is another example of a component that utilizes data from the commerce management engine 136 but may be located outside so as to not violate the isolation principle. The platform payment facility 120 may allow customers interacting with online stores 138 to have their payment information stored safely by the commerce management engine 136 such that they only have to enter it once. When a customer visits a different online store 138, even if they've never been there before, the platform payment facility 120 may recall their information to enable a more rapid and correct check out. This may provide a cross-platform network effect, where the e-commerce platform 100 becomes more useful to its merchants as more merchants join, such as because there are more customers who checkout more often because of the ease of use with respect to customer purchases. To maximize the effect of this network, payment information for a given customer may be retrievable from an online store's checkout, allowing information to be made available globally across online stores 138. It would be difficult and error prone for each online store 138 to be able to connect to any other online store 138 to retrieve the payment information stored there. As a result, the platform payment facility may be implemented external to the commerce management engine 136.

For those functions that are not included within the commerce management engine 136, applications 142A-B provide a way to add features to the e-commerce platform 100. Applications 142A-B may be able to access and modify data on a merchant's online store 138, perform tasks through the administrator 114, create new flows for a merchant through a user interface (e.g., that is surfaced through extensions/API), and the like. Merchants may be enabled to discover and install applications 142A-B through application search, recommendations, and support 128. In embodiments, core products, core extension points, applications, and the administrator 114 may be developed to work together. For instance, application extension points may be built inside the administrator 114 so that core features may be extended by way of applications, which may deliver functionality to a merchant through the extension.

In embodiments, applications 142A-B may deliver functionality to a merchant through the interface 140A-B, such as where an application 142A-B is able to surface transaction data to a merchant (e.g., App: "Engine, surface my app data in mobile and web admin using the embedded app SDK"), and/or where the commerce management engine 136 is able to ask the application to perform work on demand (Engine: "App, give me a local tax calculation for this checkout").

Applications 142A-B may support online stores 138 and channels 110A-B, provide for merchant support, integrate with other services, and the like. Where the commerce management engine 136 may provide the foundation of services to the online store 138, the applications 142A-B may provide a way for merchants to satisfy specific and sometimes unique needs. Different merchants will have different needs, and so may benefit from different applications 142A-B. Applications 142A-B may be better discovered through the e-commerce platform 100 through development of an application taxonomy (categories) that enable applications to be tagged according to a type of function it performs for a merchant; through application data services that support searching, ranking, and recommendation models; through application discovery interfaces such as an application store, home information cards, an application settings page; and the like.

Applications 142A-B may be connected to the commerce management engine 136 through an interface 140A-B, such as utilizing APIs to expose the functionality and data available through and within the commerce management engine 136 to the functionality of applications (e.g., through REST, GraphQL, and the like). For instance, the e-commerce platform 100 may provide API interfaces 140A-B to merchant and partner-facing products and services, such as including application extensions, process flow services, developer-facing resources, and the like. With customers more frequently using mobile devices for shopping, applications 142A-B related to mobile use may benefit from more extensive use of APIs to support the related growing commerce traffic. The flexibility offered through use of applications and APIs (e.g., as offered for application development) enable the e-commerce platform 100 to better accommodate new and unique needs of merchants (and internal developers through internal APIs) without requiring constant change to the commerce management engine 136, thus providing merchants what they need when they need it. For instance, shipping services 122 may be integrated with the commerce management engine 136 through a shipping or carrier service API, thus enabling the e-commerce platform 100 to provide shipping service functionality without directly impacting code running in the commerce management engine 136.

Many merchant problems may be solved by letting partners improve and extend merchant workflows through application development, such as problems associated with back-office operations (merchant-facing applications 142A-B) and in the online store 138 (customer-facing applications 142A-B). As a part of doing business, many merchants will use mobile and web related applications on a daily basis for back-office tasks (e.g., merchandising, inventory, discounts, fulfillment, and the like) and online store tasks (e.g., applications related to their online shop, for flash-sales, new product offerings, and the like), where applications 142A-B, through extension/API 140A-B, help make products easy to view and purchase in a fast growing marketplace. In embodiments, partners, application developers, internal applications facilities, and the like, may be provided with a software development kit (SDK), such as through creating a frame within the administrator 114 that sandboxes an application interface. In embodiments, the administrator 114 may not have control over nor be aware of what happens within the frame. The SDK may be used in conjunction with a user interface kit to produce interfaces that mimic the look and feel of the e-commerce platform 100, such as acting as an extension of the commerce management engine 136.

Applications 142A-B that utilize APIs may pull data on demand, but often they also need to have data pushed when updates occur. Update events may be implemented in a subscription model, such as for example, customer creation, product changes, or order cancelation. Update events may provide merchants with needed updates with respect to a changed state of the commerce management engine 136, such as for synchronizing a local database, notifying an external integration partner, and the like. Update events may enable this functionality without having to poll the commerce management engine 136 all the time to check for updates, such as through an update event subscription. In embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In embodiments, update events may be queued and processed asynchronously from a state change that triggered them, which may produce an update event notification that is not distributed in real-time.

In embodiments, the e-commerce platform 100 may provide application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, a description of core application capabilities within the commerce management engine 136, and the like. These support facilities may be utilized by application development performed by any entity, including the merchant developing their own application 142A-B, a third-party developer developing an application 142A-B (e.g., contracted by a merchant, developed on their own to offer to the public, contracted for use in association with the e-commerce platform 100, and the like), or an application 142A or 142B being developed by internal personal resources associated with the e-commerce platform 100. In embodiments, applications 142A-B may be assigned an application identifier (ID), such as for linking to an application (e.g., through an API), searching for an application, making application recommendations, and the like.

The commerce management engine 136 may include base functions of the e-commerce platform 100 and expose these functions through APIs 140A-B to applications 142A-B. The APIs 140A-B may enable different types of applications built through application development. Applications 142A-B may be capable of satisfying a great variety of needs for merchants but may be grouped roughly into three categories: customer-facing applications, merchant-facing applications, integration applications, and the like. Customer-facing applications 142A-B may include online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways.

In embodiments, an application developer may use an application proxy to fetch data from an outside location and display it on the page of an online store 138. Content on these proxy pages may be dynamic, capable of being updated, and the like. Application proxies may be useful for displaying image galleries, statistics, custom forms, and other kinds of dynamic content. The core-application structure of the e-commerce platform 100 may allow for an increasing number of merchant experiences to be built in applications 142A-B so that the commerce management engine 136 can remain focused on the more commonly utilized business logic of commerce.

The e-commerce platform 100 provides an online shopping experience through a curated system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products on a channel 110A-B. A channel 110A-B is a place where customers can view and buy products. In embodiments, channels 110A-B may be modeled as applications 142A-B (a possible exception being the online store 138, which is integrated within the commence management engine 136). A merchandising component may allow merchants to describe what they want to sell and where they sell it. The association between a product and a channel may be modeled as a product publication and accessed by channel applications, such as via a product listing API. A product may have many options, like size and color, and many variants that expand the available options into specific combinations of all the options, like the variant that is extra-small and green, or the variant that is size large and blue. Products may have at least one variant (e.g., a "default variant" is created for a product without any options). To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Products may be viewed as 2D images, 3D images, rotating view images, through a virtual or augmented reality interface, and the like.

In embodiments, the customer may add what they intend to buy to their cart (in an alternate embodiment, a product may be purchased directly, such as through a buy button as described herein). Customers may add product variants to their shopping cart. The shopping cart model may be channel specific. The online store 138 cart may be composed of multiple cart line items, where each cart line item tracks the quantity for a product variant. Merchants may use cart scripts to offer special promotions to customers based on the content of their cart. Since adding a product to a cart does not imply any commitment from the customer or the merchant, and the expected lifespan of a cart may be in the order of minutes (not days), carts may be persisted to an ephemeral data store.

The customer then proceeds to checkout. A checkout component may implement a web checkout as a customer-facing order creation process. A checkout API may be provided as a computer-facing order creation process used by some channel applications to create orders on behalf of customers (e.g., for point of sale). Checkouts may be created from a cart and record a customer's information such as email address, billing, and shipping details. On checkout, the merchant commits to pricing. If the customer inputs their contact information but does not proceed to payment, the e-commerce platform 100 may provide an opportunity to re-engage the customer (e.g., in an abandoned checkout feature). For those reasons, checkouts can have much longer lifespans than carts (hours or even days) and are therefore persisted. Checkouts may calculate taxes and shipping costs based on the customer's shipping address. Checkout may delegate the calculation of taxes to a tax component and the calculation of shipping costs to a delivery component. A pricing component may enable merchants to create discount codes (e.g., 'secret' strings that when entered on the checkout apply new prices to the items in the checkout). Discounts may be used by merchants to attract customers and assess the performance of marketing campaigns. Discounts and other custom price systems may be implemented on top of the same platform piece, such as through price rules (e.g., a set of prerequisites that when met imply a set of entitlements). For instance, prerequisites may be items such as "the order subtotal is greater than $100" or "the shipping cost is under $10", and entitlements may be items such as "a 20% discount on the whole order" or "$10 off products X, Y, and Z".

Customers then pay for the content of their cart resulting in the creation of an order for the merchant. Channels 110A-B may use the commerce management engine 136 to move money, currency or a store of value (such as dollars or a cryptocurrency) to and from customers and merchants. Communication with the various payment providers (e.g., online payment systems, mobile payment systems, digital wallet, credit card gateways, and the like) may be implemented within a payment processing component. The actual interactions with the payment gateways 106 may be provided through a card server environment. In embodiments, the payment gateway 106 may accept international payment, such as integrating with leading international credit card processors. The card server environment may include a card server application, card sink, hosted fields, and the like. This environment may act as the secure gatekeeper of the sensitive credit card information. In embodiments, most of the process may be orchestrated by a payment processing job. The commerce management engine 136 may support many other payment methods, such as through an offsite payment gateway 106 (e.g., where the customer is redirected to another website), manually (e.g., cash), online payment methods (e.g., online payment systems, mobile payment systems, digital wallet, credit card gateways, and the like), gift cards, and the like. At the end of the checkout process, an order is created. An order is a contract of sale between the merchant and the customer where the merchant agrees to provide the goods and services listed on the orders (e.g., order line items, shipping line items, and the like) and the customer agrees to provide payment (including taxes). This process may be modeled in a sales component. Channels 110A-B that do not rely on commerce management engine 136 checkouts may use an order API to create orders. Once an order is created, an order confirmation notification may be sent to the customer and an order placed notification sent to the merchant via a notification component. Inventory may be reserved when a payment processing job starts to avoid over-selling (e.g., merchants may control this behavior from the inventory policy of each variant). Inventory reservation may have a short time span (minutes) and may need to be very fast and scalable to support flash sales (e.g., a discount or promotion offered for a short time, such as targeting impulse buying). The reservation is released if the payment fails. When the payment succeeds, and an order is created, the reservation is converted into a long-term inventory commitment allocated to a specific location. An inventory component may record where variants are stocked, and tracks quantities for variants that have inventory tracking enabled. It may decouple product variants (a customer facing concept representing the template of a product listing) from inventory items (a merchant facing concept that represent an item whose quantity and location is managed). An inventory level component may keep track of quantities that are available for sale, committed to an order or incoming from an inventory transfer component (e.g., from a vendor).

The merchant may then review and fulfill (or cancel) the order. A review component may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) and mark the order as paid. The merchant may now prepare the products for delivery. In embodiments, this business process may be implemented by a fulfillment component. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. A custom fulfillment service may send an email (e.g., a location that doesn't provide an API connection). An API fulfillment service may trigger a third party, where the third-party application creates a fulfillment record. A legacy fulfillment service may trigger a custom API call from the commerce management engine 136 to a third party (e.g., fulfillment by Amazon). A gift card fulfillment service may provision (e.g., generating a number) and activate a gift card. Merchants may use an order printer application to print packing slips. The fulfillment process may be executed when the items are packed in the box and ready for shipping, shipped, tracked, delivered, verified as received by the customer, and the like.

If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees, or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In embodiments, the e-commerce platform 100 may enable merchants to keep track of changes to the contract of sales over time, such as implemented through a sales model component (e.g., an append-only date-based ledger that records sale-related events that happened to an item).

In an embodiment, the present disclosure relates to the capture of images or video of a retail environment relating to a retail transaction. Specifically, the present disclosure describes connecting to peripheral devices, and specifically cameras, for capturing images and video related to a retail transaction.

Figure 3:
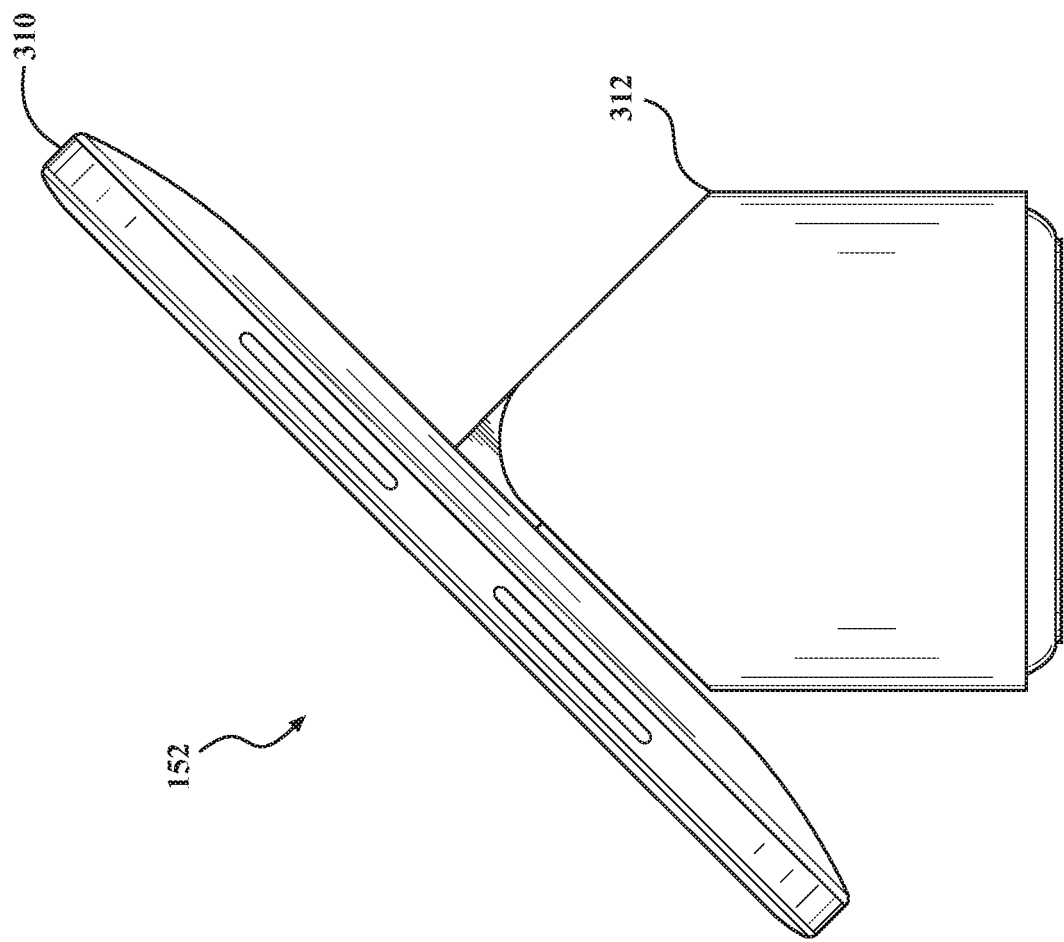
FIG. 3 depicts a point-of-sale device according to an embodiment.
Figure 4:
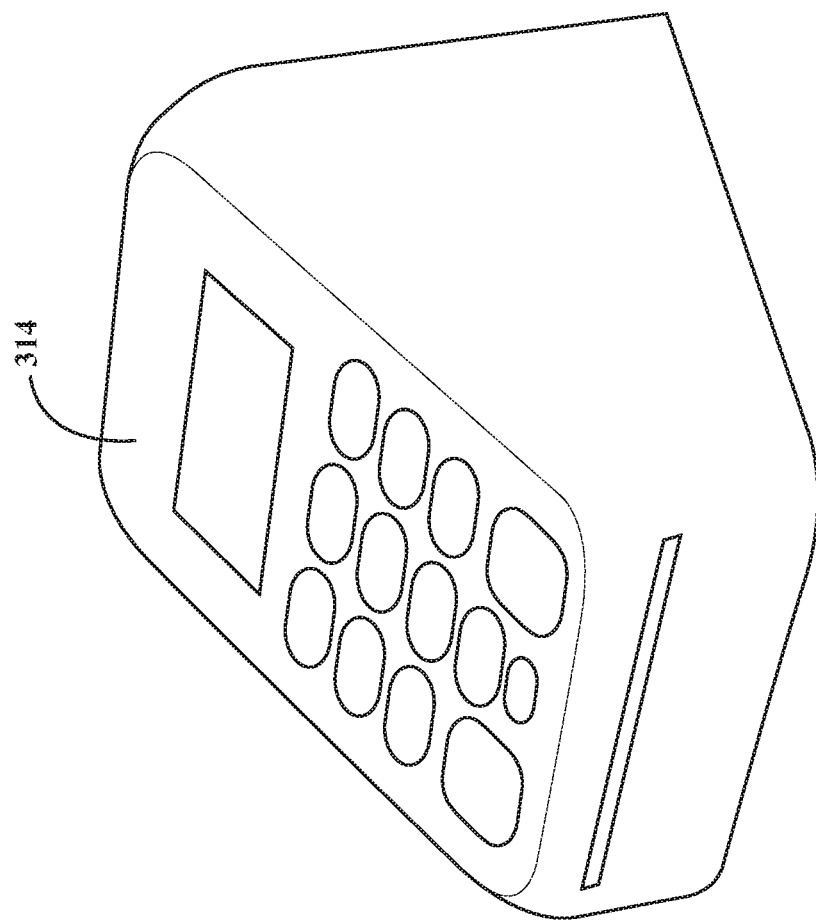
FIG. 4 depicts a payment card reader device according to an embodiment.

In that regard and as an embodiment of the present disclosure, FIG. 3 shows a POS device 152 that comprises a tablet device 310 and a tablet stand 312 for supporting the tablet device 310 in a fixed location. The tablet device 310 may be detachable from the tablet stand 312 and movable within a retail location or fixed to a specified point-of-sale location. While described as a tablet device 310, the retail POS device 152 may be a mobile phone, a laptop or desktop computer, or a type of dedicated point-of-sale checkout device. The POS device 152 may incorporate a payment card reader or, as described in FIG. 4 be attached to a peripheral device that comprises a payment card reader 314.

The payment card reader 314 may be a reader that reads magnetic stripe cards or cards or devices incorporating chip technologies, such as EMV chip technologies, that are read through contact or near-field communication technologies.

Figure 5:
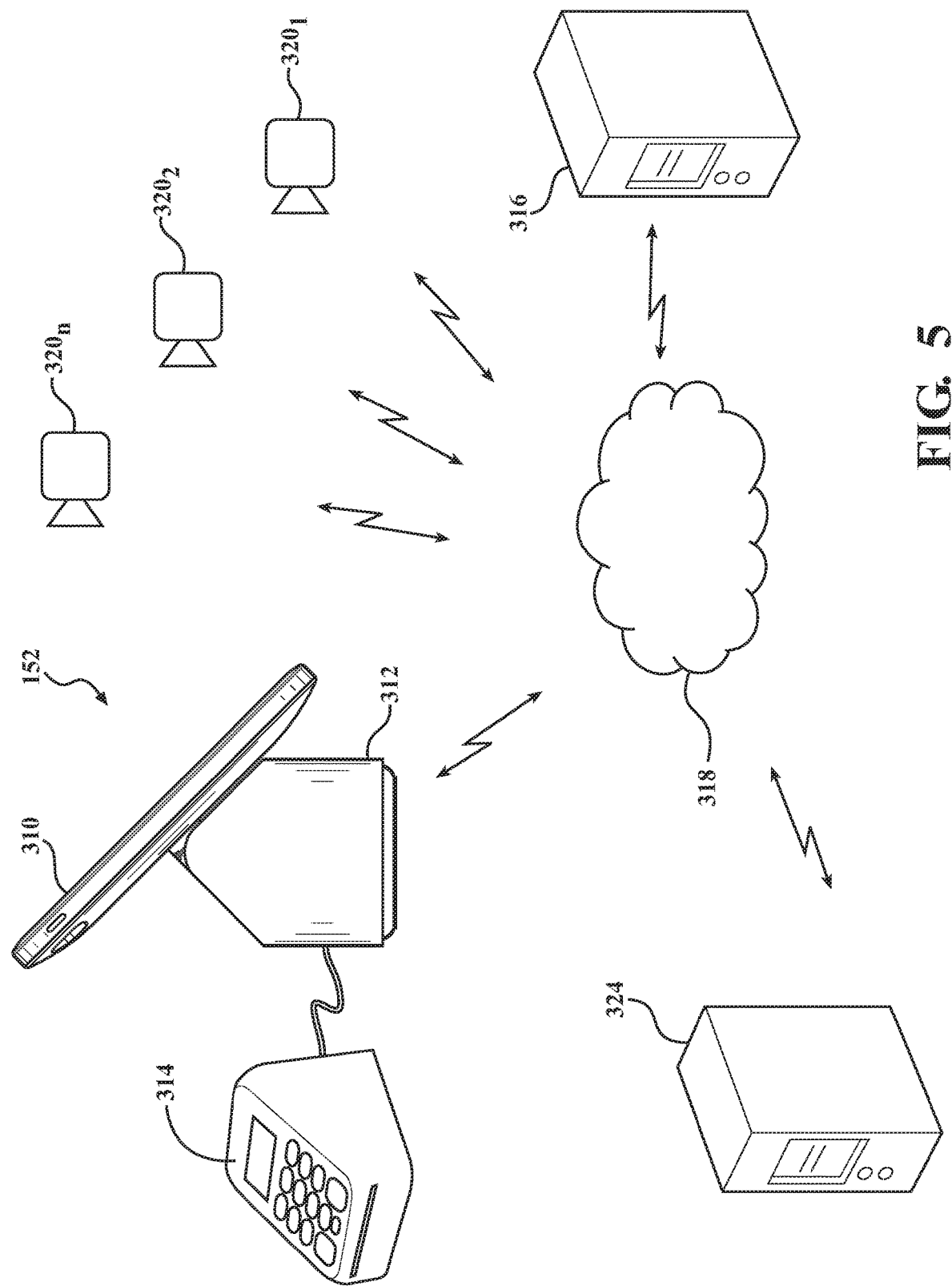
FIG. 5 depicts a retail system incorporating a retail device, server and cameras according to an embodiment.

As shown in FIG. 5, the POS device 152 is further capable of connecting to a server 316 through a wide area network 318. The POS device 152 may further connect to the server 316 to clear payment cards through a payment network or connect directly to the payment network to clear payment card transactions. The server 316 and any of the other devices described herein may be part of the e-commerce platform 100. All references to server 316 herein may instead be references to the e-commerce platform 100 having the capabilities of the server 316. As such, it is understood by one of ordinary skill in the art the functions of the server 316 may be implemented by features of the e-commerce platform 100, by a server within the e-commerce platform 100 or by a server separate from the e-commerce platform 100.

Generally, server 316 is configured to provide commerce services for one or more merchants e.g. in the form of Software-as-a-Service (SaaS). For example, server 316 may be configured to host on-line stores for different merchants and store information related to transactions such as point-of-sale and/or on-line transactions. The transaction information may be any information associated with the sale or the offering for sale of a product or service, which, for example, could include products or services purchased, and/or information identifying the transaction (e.g. time, date, location), customer, delivery (e.g. shipping location), etc. Such services may alternatively be provided by the e-commerce platform 100. In the example of FIG. 5, server 316 is further configured to communicate with a plurality of cameras $320_1$, $320_2$, ... $320_n$. Cameras 320 may be strategically disposed within a retail location housing the POS device 152 and positioned to capture images from the retail location that identify the condition of the retail location at the time of a transaction. For example, the cameras 320 may be positioned to capture images of the POS devices 152, customers, retail agents, merchandise located within the retail location, and/or an entrance/exist within the retail location.

In an embodiment, the POS device 152 communicates with the server 316 to cause the server 316 to communicate with the cameras 320 to cause each camera 320 to take an image at the time of processing of each payment card transaction. The images are then communicated to the server 316 to be associated with the transaction for later retrieval and presentation. Alternatively, the POS device 152 communicates directly with each camera 320 to cause the cameras to take an image at the time of processing of each payment card transaction. The images are then communicated to the POS device 152, which may optionally subsequently transmit the images to the server 316 (e.g. with other transaction information obtained by the POS device 152) to be associated with the transaction for later retrieval and presentation. Alternatively, the images may be retained within storage located on the POS device 152 and associated with the transaction. In this manner, images remain accessible by the POS 152 device in the absence of the connection to the wide area network, for example when the connection is interrupted and can be transmitted later to server 316 when the connection is re-established. As can be seen from these examples, the association can be performed by the POS device 152, the server 316, any other device configured to communicate with the server 316, any merchant device 102 or any aspect of the e-commerce platform 100. Optionally, the existence of images associated with the transaction are communicated to a user of the POS device 152 by showing a thumbnail of an image, or multiple images, on the display when viewing the transaction or a list of transactions. The images are further identified to communicate the identity or location of the camera that captured the image.

In an alternative embodiment, the cameras 320 may capture video from the time of the payment card transaction for a predetermined time interval or may capture video from prior to the payment card transaction for a predetermined time interval (e.g. from the creation of an order for the transaction), or may capture video from prior to, and after, the payment card transaction for predetermined time intervals. In embodiments, a predetermined time interval described herein may instead be dynamically determined, such as by detecting certain motion or activity and capturing that motion or activity. Further, the triggering event for the capturing of video may comprise events other than a payment card transaction, such as removal or movement of the tablet device 310 from the tablet stand 312 or from a typical point-of-sale location, the occurrence of an in-store pickup of merchandise, a cash drawer opening and/or closing, or a returned or exchanged order.

The POS device 152 preferably includes a display which may optionally display the captured images to a retail agent at or near the time of capture when clearing a payment card transaction. The display, which may be interactive, preferably comprises an interface which allows a user to search and review previous transactions, view details of previous transactions and view captured images or video taken contemporaneously with the previous transaction, as described above.

In a further embodiment, server 316 stores information about transactions and images or video captured contemporaneously with a payment card transaction or other event. The interactive display preferably comprises an interface which allows a user to search and review previous transactions, view details of previous transactions and view captured images or video taken contemporaneously with previous transactions, as described above.

In a further embodiment, the POS device 152 or server 316 may communicate with cameras 320 to capture video or images after the expiration of a predetermined length of time. Further, captured video or images may be stored on server 316 and analyzed to determine the number of customers located within the retail location at various points in time.

In some embodiments, the captured video and images may be used to enhance the context data stored and/or presented for a particular transaction. The capture of transactional context allows a merchant to better market products and develop marketing programs that target various types of purchasers and/or are better adapted for diverse retail locations. Capture of transactional context and retail location data, such as headcount and traffic patterns, allows a retail to better place products within a store to drive sales and identify repeat or high value customers.

For example, based on the captured video/images, the server 316 (or some other device connected thereto) may be configured to store and/or present information regarding the number of customers located within the retail location to the user to provide information about customer traffic and compared to sales data for a corresponding time period to provide information about customer-to-sales conversion rates. A customer traffic heat map image correlated to time of day over the course of a period of time may be presented to the merchant. In another embodiment, the server 316 may be configured to count customer traffic, binary events, such as objects moving in camera frame, to discern customer traffic indirectly and optionally correlating the binary events to sales data to customer purchase data over the same time period to determine a specific conversion rate or to determine an ambiguous spectrum, such as "high conversion rate" and "low conversion rate." Further, the server 316 may be configured to analyze images or video related to transactions to determine whether the retail location was busy or not busy at the time of a specific transaction. For example, images and video data associated with transactions can be analyzed to determine whether the retail location was busy when processing a return, thereby slowing or deterring customers from making new purchases during high volume periods. This information can be used to optimize the sales process, for example, by limiting returns to a subset of the POS devices 152 or to a certain period of time.

In a further embodiment, the server 316 may configured to implement facial recognition technology (e.g. using a software application executed on server 316) to identify customers from the images or video captured and correlate customer facial recognition data with the transaction information to identify customers. Based upon the identification or non-identification of a customer as a repeat customer, offers for discounts on items purchased or offers for the purchase of further items may be presented to the customer. Further, based upon facial recognition of the customer, information about repeat sales may be presented to the merchant to provide sales data pertaining repeat customers and new customers.

In a further embodiment, cameras 320 may be accessed to view images or video from the retail location from a remote device 324 on demand to determine employee compliance, prevent or identify theft, observe foot traffic, and determine product and display popularity.

In a further embodiment, the server 316 can use camera data to determine product attribution. By analyzing image data and correlating to items purchased, information about the type of people that are buying certain items may be deduced. For example, by correlating the image data and purchase data, information about the age, gender or other demographics about customers purchasing certain products can be determined and used to present further offers or discounts to a customer based upon such data.

In a further embodiment, camera data can be analyzed by server 316 to determine areas of a retail location that are experiencing high activity and low activity. Such information can be compared to reference or baseline data, such as customers entering or exiting a retail location entrance or exit to customers appearing at a point of purchase, a specific display or portion of the retail location.

Further, the appearance of the POS device 152 in an image or video can be analyzed by server 316 to determine the location of the POS device 152 at the time of the transaction, particularly if the POS device 152 has been removed from the stand and is commonly used by associates or customers at various points in the store. The trigger for capturing data to analyze the context and location of the POS device 152 being moved can be a transaction, a motion sensor associated with the POS device 152, a change in GPS or other location data, a chip or a sensor or other means (such as a break in a wired connection or a position of the device) that detects when the POS device 152 has been removed from the stand 312.

In another embodiment, one of the cameras 320 may be a camera associated with the POS device 152 itself, such as a camera associated with a tablet computer. Moreover, a trigger for capturing an image, video data and sound data (using an associated microphone) may include deviation of the POS device 152 from an address or home location, connection to a new network, or the expiration of a period of time from a previous transaction. After the trigger the camera incorporated in the POS device 152 is used to determine the identity or location of a person who has taken the POS device 152 from the retail location, such as in the case of theft.

In another embodiment, location data determined by the POS device 152 (such as GPS data or location data determined from wireless networks) may be associated with image or video data as metadata to associate the image or video with a physical location.

In yet a further embodiment, camera data can be analyzed to determine traffic patterns versus sales data to determine, for example, that certain items sell during busy or slow periods or that higher value items or lower value items sell better during particular customer traffic patterns.

Figure 6:
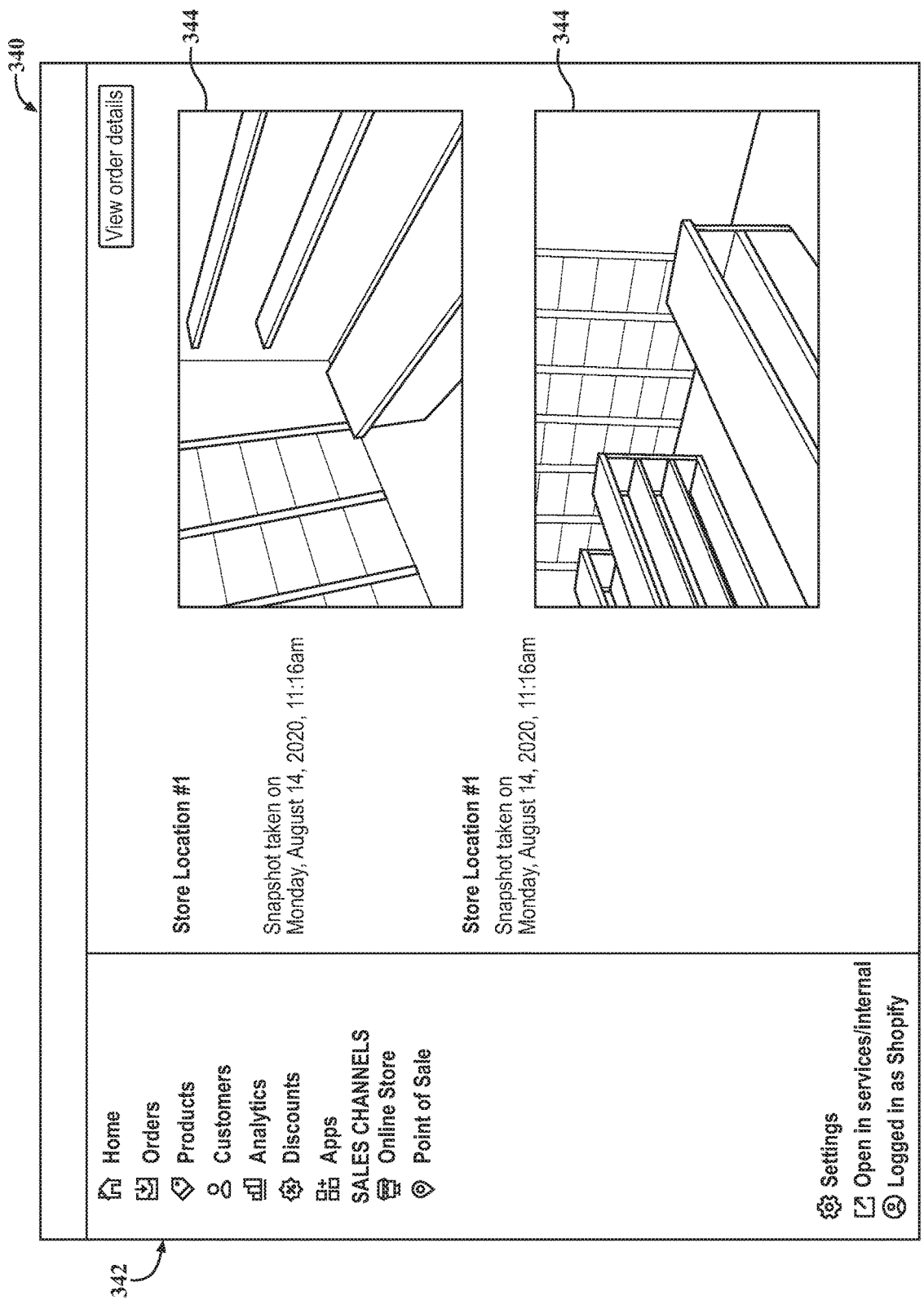
FIG. 6 depicts a user interface presenting video and/or image data associated with a transaction or other event according to an embodiment.

Referring to FIG. 6, there is a provided an example of a computer interface 40 of an on-line store hosted by server 316 showing images captured at the time of a transaction. The interface 340 comprises a navigation section 342 for a user to select information for display, such as a listing of orders, a listing to products purchased, a listing or customers identified and analytics about purchasing trends. In one example, selection of a specific order causes information about the order to be presented, including items purchased and still images or video 344 captured contemporaneously with the purchased items as well as any additional information which might be derived by the server 316 from an analysis of the captured images/video as explained above.

Figure 7:
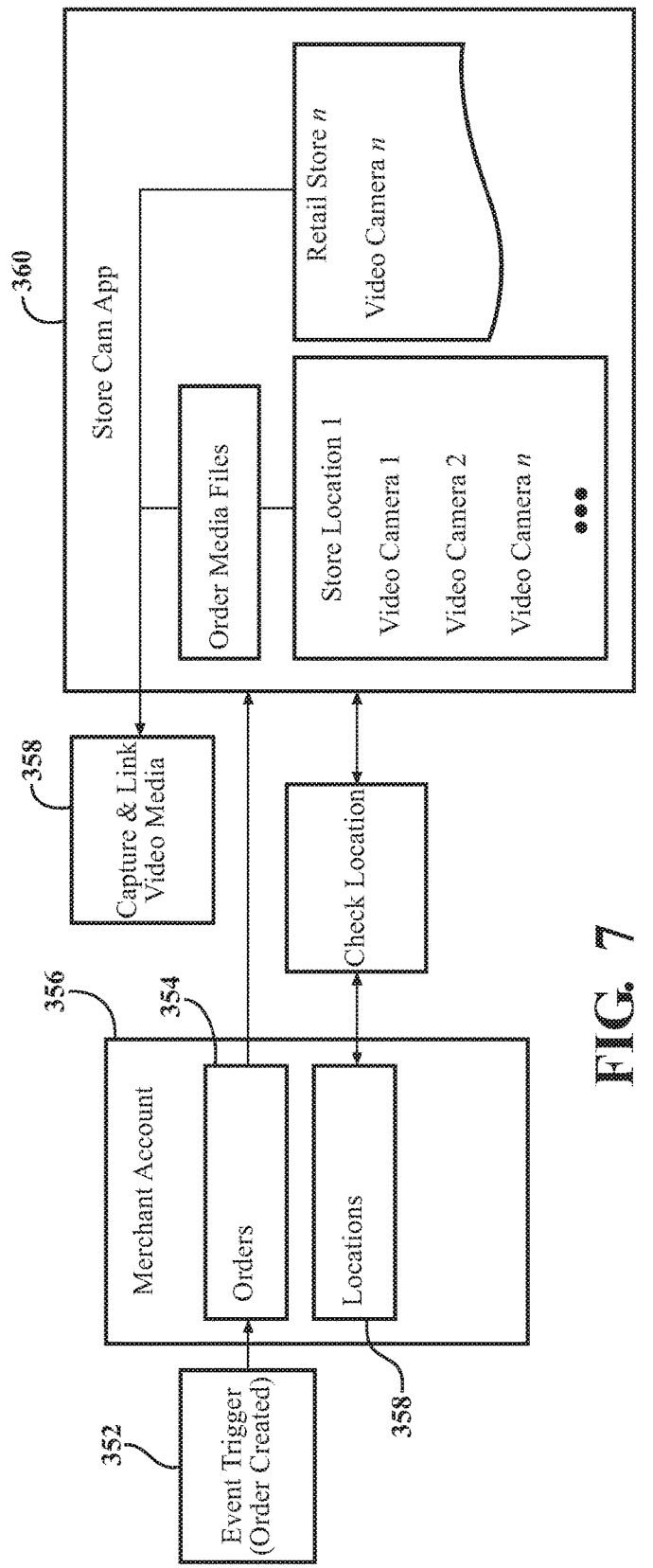
FIG. 7 depicts an order attribution architecture according to an embodiment.

Referring to FIG. 7, in an embodiment, a general order or transaction attribution architecture 350 is presented. In the architecture 350, an event trigger 352 for capturing image or video data occurs, for example, an order is created or a payment card is processed. Order information 354 pertaining to the order is stored on server 316 in a database and associated with a merchant account 356 and merchant location 358. Associated with the event trigger, image or video data contemporaneous to the transaction can be captured, stored and associated with the order 354. To accomplish the capturing of video and/or image data, a store camera application 360 (which could be executed on server 316 or elsewhere) assembles and orders the media files, if more than one, and associates the media files and metadata associated with the media file, such as identifying the camera used to capture the video and/or image data to determine the identity of the retail store and location within the retail store where the image or video was captured. The image data and location is then associated with the merchant account 56.

Figure 8:
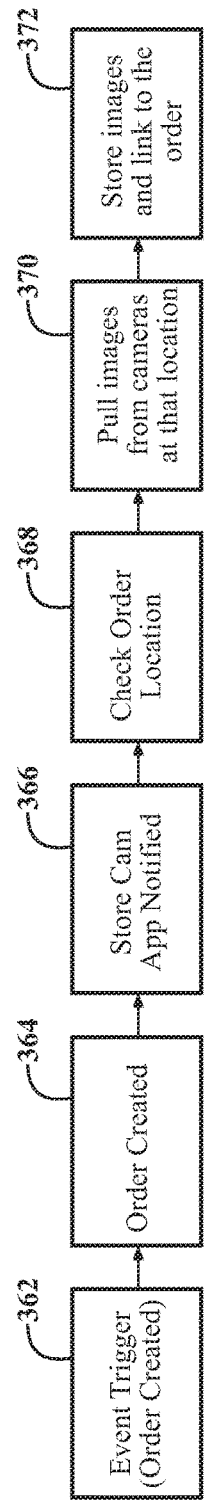
FIG. 8 depicts an order attribution task flow according to an embodiment.

Referring to FIG. 8, an exemplary task flow for assembling order data and image/video data is depicted. In first step 362, the event trigger for capturing image or video data occurs, such as a new order being created, next the order is created 364. In subsequent step 366, a store camera application is notified, and image and/or video data is captured by the camera. Next, order location is checked 368, and in a subsequent step 370, image and/or video data is transmitted from the camera to the server 316. In a final step 372, image and/or video data is associated with the order.

In the embodiments herein, several capabilities of the POS device 152 and cameras have been described. In such embodiments, the POS device 152 identifies a triggering event to generate image, sound or video data based upon the occurrence of the triggering event. Triggering events, without limitation, include the occurrence of a transaction, a clearance or denial of a payment transaction, a voiding of a sales transaction, a turning on or off of the POS device 152, an opening of a cash drawer, a change in network connection, a product return or refund, a printing of a sales receipt, an entry of a new customer profile or address, a redemption of rewards or customer loyalty program points, a purchase of a specific product, a purchase of products over a price threshold, a purchase of products by a specific customer or customer matching certain criteria, an entry of a layaway transaction, an entry of a special order transaction, a purchase of an extended product warranty, a scanning of a product bar code, a movement of the POS device 152 to a location or a predetermined distance from a home location, or removal from a stand, and/or an identification of a face in a camera frame.

Moreover, in the embodiments herein, while the triggering event triggers the capture of image or video data, the triggering event may also trigger the capture of other data associated with the point-of-sale from a sensor integrated within the POS device 152 or connected with the POS device 152 as peripheral device, such as audio data, GPS or other location data, and data such as temperature, humidity or other environmental data regarding the retail location. For example, temperature data can be correlated with transaction data to determine whether the temperature in the store induces or inhibits the sale of certain types of products or services. Further, information about temperature can be used to determine whether conditions in the store are not ideal for customer comfort or for the care of products being sold in the store, such as fragile products such as flowers in a flower shop.

In another embodiment, the capture of data triggered by the triggering event may be external data available over a wide area network, such as weather data, traffic data, calendar data (such as data related to special events, such as sporting events, occurring within a certain distance or geographical area), or customer review data. This external data may further be used (e.g. by server 316) to correlate with the transaction data to determine the effect of external events on sales.

In yet another embodiment, the server 316 (or other device such as POS device 152) may determine whether to capture data from a sensor based upon a POS device's 152 proximity to the sensor, such that only the most relevant data is captured with the transaction. In large retail locations, many sensors may be disposed within the location that have little or no relevance to the transaction. For example, location data associated with a sensor can be compared with location data of the POS device 152 to include only information from sensors within a predetermined range, a predetermined number of sensors with the closest proximity, sensors that have a line-of-sight to the POS device 152, sensors within (or associated with) a predetermined zone in which the POS device 152 is located, or sensors above a predetermined connection signal strength to the POS device 152. Ranges and sensors may be optionally differentiated for determining relevance based upon sensor type. Further, the range and type of sensor data stored may be set in relation to the transaction value being processed, the transaction type being processed or the type of triggering event that generated the sensor data capture event, such that for high value transactions or trigger types more sensor data is stored and for low value transactions or trigger types less sensor data is stored, or sensor data is not stored at all. For example, the server 316 or POS device 152 may be configured (based on a setting controlled by the merchant) to determine that sensor data, or just certain types of sensor data, below a threshold transaction amount or certain types of products or certain types of triggers (for example, an exchange or sale of a product for which stock is low and future sales are limited) is not stored. The server 316 and/or POS device 152 may also determine (for example, based on a setting controlled by the merchant) the types of sensor data to store based on temporal proximity to other data that has already been captured. For example, if several transactions are processed in rapid succession, certain types of sensor data or certain sensors may not be recaptured for the subsequent transaction (s) within a threshold time. For example, video information may not be captured for a subsequent transaction if it was previously captured for a prior transaction within a predetermined period of time (such as 30 seconds).

Triggers may also include triggering capture of moment-in-time data such as capturing data from a predetermined time before and after the triggering event, such as capturing 30 seconds prior to and 30 seconds of video or sound or other sensor data based upon a triggering event, such as a completed transaction.

Figure 9:
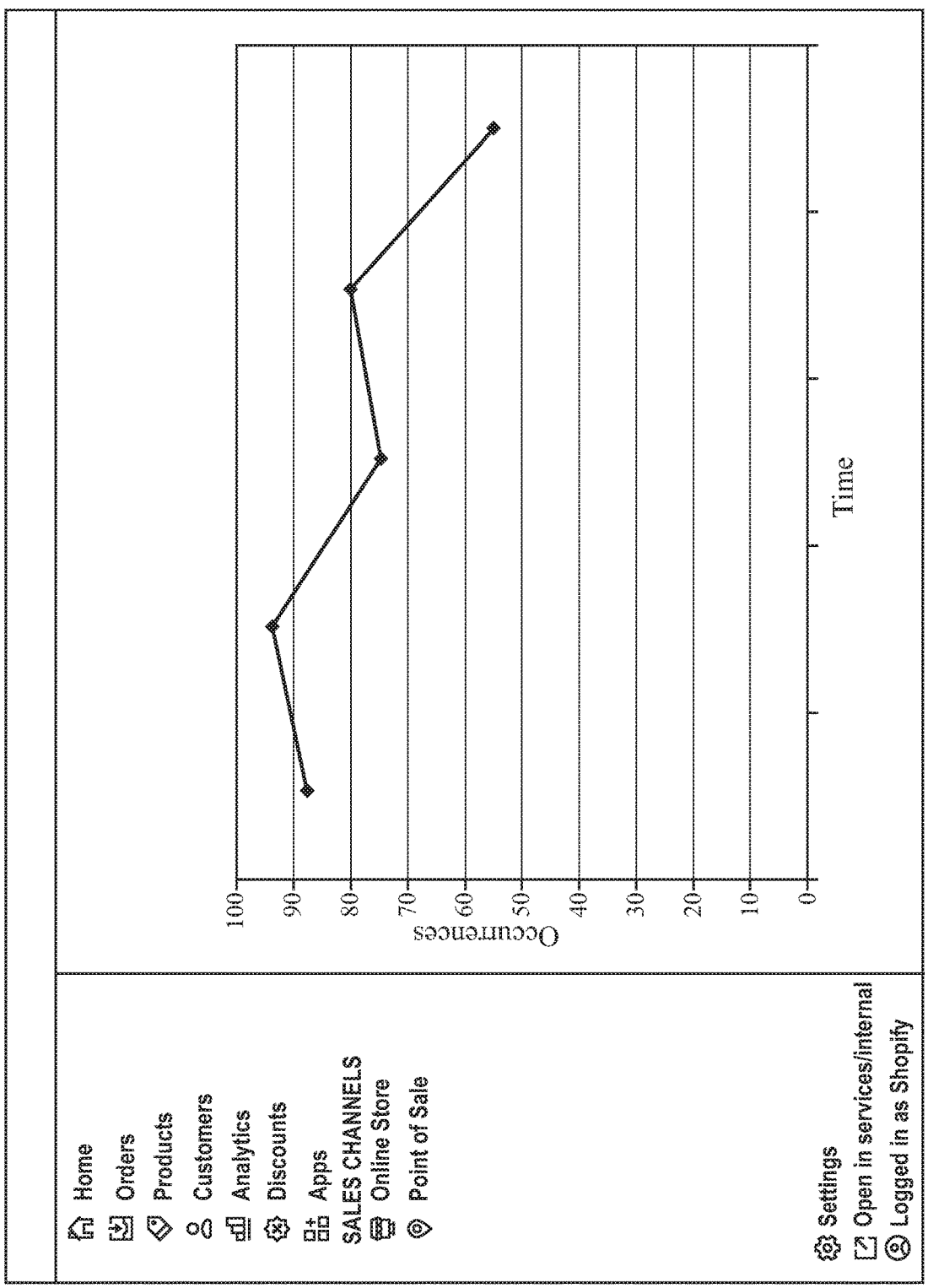
FIG. 9 depicts a user interface presenting sensor data in the aggregate according to an embodiment.

Referring to FIG. 9, information about transaction data can further be displayed to a user (e.g. merchant) in the aggregate, for example, by showing the typical number of transactions per hour based upon time of day.

The methods and systems described herein may be deployed in part or in whole through a machine that executes computer software, program codes, and/or instructions on a processor. The processor may be part of a server, cloud server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, cloud server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented in different devices which may operate in wired or wireless networks. Examples of wireless networks include 4th Generation (4G) networks (e.g. Long Term Evolution (LTE)) or 5th Generation (5G) networks, as well as non-cellular networks such as Wireless Local Area Networks (WLANs). However, the principles described therein may equally apply to other types of networks.

The operations, methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another, such as from usage data to a normalized usage dataset.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above, and combinations thereof may be embodied in computer executable code that, when executing on one or more computing devices, performs the steps thereof. In another aspect, the methods may be embodied in systems that perform the steps thereof and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

What is claimed is:

1. A method of capturing sensor data associated with a retail location comprising the steps of:
   with a point-of-sale device for processing a customer transaction, generating an event trigger for capturing sensor data from one or more sensors at the retail location;
   in response to the event trigger, capturing the sensor data from the one or more sensors at the retail location;
   determining a stock level of a product for the customer transaction;
   in response to the stock level of the product being at or above a threshold value, storing a first subset of sensor data from the captured sensor data;
   in response to the stock level of the product being below the threshold value, storing a second subset of sensor data from the captured sensor data, wherein the first subset of sensor data is larger than the second subset of sensor data; and
   providing access to the first subset of sensor data or the second subset of sensor data and event triggers via a user interface of the point-of-sale device for review.

2. The method of claim 1 wherein the one or more sensors comprises a plurality of sensors further comprising the step of determining a subset of the plurality of sensors from which to capture sensor data.

3. The method of claim 1 wherein the sensor data is stored on a remote data storage server.

4. The method of claim 1 wherein one or more of the sensors is a camera and the sensor data is at least one of image data and video data.

5. The method of claim 1 wherein one of the sensors is a camera and the sensor data is video data from a predetermined period of time before and after the event trigger.

6. The method of claim 1 wherein one or more of the sensors is a camera integrated within the point-of-sale device and the sensor data is at least one of image data and video data.

7. The method of claim 1 where in the point-of-sale device communicates directly with the sensors.

8. The method of claim 1 where in the point-of-sale device communicates with the sensors indirectly through an intermediate server.

9. The method of claim 1 wherein the event trigger is at least one of: an occurrence of a transaction, a clearance or denial of a payment transaction, a voiding of a sales transaction, a turning on or off of the point-of-sale device, an opening of a cash drawer, a change in network connection, a product return or refund, a printing of a sales receipt, an entry of a new customer profile or address, a redemption of rewards or customer loyalty program points, a purchase of a specific product, a purchase of products over a price threshold, a purchase of products by a specific customer or customer matching certain criteria, an entry of a layaway transaction, an entry of a special order transaction, a purchase of an extended product warranty, scanning of a product bar code, movement of the point-of-sale device to a location or a predetermined distance from a home location, or removal from a stand, and/or an identification of a face in a camera frame.

10. A system for capturing sensor data associated with a retail location comprising:
    a point-of-sale device for processing a transaction wherein the point-of-sale device comprises a display, the point-of-sale device adapted to transmit, in response to user input at the point-of-sale device, an event trigger for capturing sensor data from one or more sensors located at the retail location, the point-of-sale device further being in data communication with a data storage medium that stores the captured sensor data from the one or more sensors and the event trigger, wherein range and type of data stored is based in part on a stock level of a product associated with the transaction, and wherein a user interface displays the stored sensor data and the event trigger.

11. The system of claim 10 wherein the one or more sensors are located within the retail location for capturing data about the retail location.

12. The system of claim 10 wherein the one or more sensors comprises a plurality of sensors and wherein the point-of-sale device is adapted to determine a subset of the plurality of sensors from which to capture sensor data.

13. The system of claim 10 further comprising a remote data storage server in data communication with the point-of-sale device and the sensor and wherein the sensor data is stored on the remote data storage server.

14. The system of claim 13 wherein the one or more sensors comprises a plurality of sensors and wherein the remote data storage server is adapted to determine a subset of the plurality of sensors from which to capture sensor data.

15. The system of claim 10 wherein one or more of the sensors is a camera and the sensor data is at least one of image data and video data.

16. The system of claim 10 wherein one or more of the sensors is a camera and the sensor data is video data from a predetermined period of time before and after the event trigger.

17. The system of claim 10 wherein the point-of-sale device further comprises an integrated camera and one of the sensors comprises the integrated camera and the sensor data is at least one of image data and video data.

18. The system of claim 10 where in the point-of-sale device communicates directly with the sensors.

19. The system of claim 10 where in the point-of-sale device communicates with the sensors indirectly through an intermediate server.

20. The system of claim 10 wherein the event trigger is at least one of: an occurrence of a transaction, a clearance or denial of a payment transaction, a voiding of a sales transaction, a turning on or off of the point-of-sale device, an opening of a cash drawer, a change in network connection, a product return or refund, a printing of a sales receipt, an entry of a new customer profile or address, a redemption of rewards or customer loyalty program points, a purchase of a specific product, a purchase of products over a price threshold, a purchase of products by a specific customer or customer matching certain criteria, an entry of a layaway transaction, an entry of a special order transaction, a purchase of an extended product warranty, scanning of a product bar code, movement of the point-of-sale device to a location or a predetermined distance from a home location, or removal from a stand, and/or an identification of a face in a camera frame.

21. A system for capturing camera data associated with a retail location comprising:
a point-of-sale device for processing a transaction, wherein the point-of-sale device is adapted to transmit an event trigger for capturing at least one of image and video data from one or more cameras located at the retail location, the point-of-sale device further being in data communication with a data storage medium that stores the captured image and video data from the one or more cameras, wherein range and type of the image and video data stored is based in part on an associated type of event trigger and a stock level of a product associated with the transaction, and wherein a user interface of the point-of-sale device displays the stored image and video data and the associated type of event trigger.

22. The system of claim 21 wherein the one or more cameras are located within the retail location for capturing at least one of an image or video about the retail location.

23. The system of claim 21 wherein the one or more cameras comprises a plurality of cameras and wherein the point-of-sale device is adapted to determine a subset of the plurality of cameras from which to capture image and video data.

24. The system of claim 21 wherein the data storage medium comprises a remote data storage server in data communication with the point-of-sale device and the one or more cameras, and wherein the image and video data is stored on the remote data storage server.

25. The system of claim 24 wherein the one or more cameras comprises a plurality of cameras and wherein the remote data storage server is adapted to determine a subset of the plurality of cameras from which to capture image and video data.

26. The system of claim 21 wherein the captured image and video data comprises video data from a predetermined period of time before and after the event trigger.

27. The system of claim 21 wherein the point-of-sale device further comprises an integrated camera and the image and video data is data captured by the integrated camera.

28. The system of claim 21 where in the point-of-sale device communicates directly with the cameras.

29. The system of claim 21 wherein the point-of-sale device communicates with the cameras indirectly through an intermediate server.

30. The system of claim 21 wherein the event trigger is at least one of: an occurrence of a transaction, a clearance or denial of a payment transaction, a voiding of a sales transaction, a turning on or off of the point-of-sale device, an opening of a cash drawer, a change in network connection, a product return or refund, a printing of a sales receipt, an entry of a new customer profile or address, a redemption of rewards or customer loyalty program points, a purchase of a specific product, a purchase of products over a price threshold, a purchase of products by a specific customer or customer matching certain criteria, an entry of a layaway transaction, an entry of a special order transaction, a purchase of an extended product warranty, scanning of a product bar code, movement of the point-of-sale device to a location or a predetermined distance from a home location, or removal from a stand, and/or an identification of a face in a camera frame.

31. The system of claim 21 wherein the system is adapted to analyze the image and video data and data related to transactions to present an indication of times of day when the retail location was busy or not busy.

32. The system of claim 21 wherein the system is adapted to capture image data including a customer's face, identify a customer identity based upon the image data and correlate customer facial recognition data with transaction information to identify repeat customers.

33. The system of claim 21 wherein the system is adapted to analyze image and video data to determine employee compliance, prevent or identify theft, observe foot traffic, and determine product and display popularity.

34. The system of claim 21 wherein the system is adapted to capture image data including a customer's face and analyze the image data to estimate customer demographic data.

35. The system of claim 21 wherein the system is adapted to analyze image and video data to determine areas of a retail location that are experiencing high activity and low activity.

36. The system of claim 21 wherein the system is adapted to analyze image and video data to determine the location of the point-of-sale device at the time of the transaction.

* * * * *